(No Model.)
R. KEELING.
RATTLE RAKE.
No. 517,865. Patented Apr. 10, 1894.
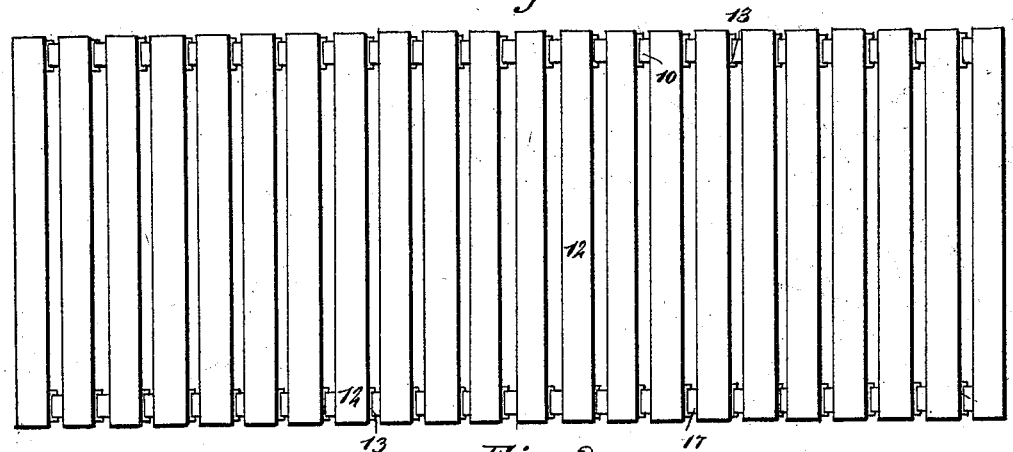
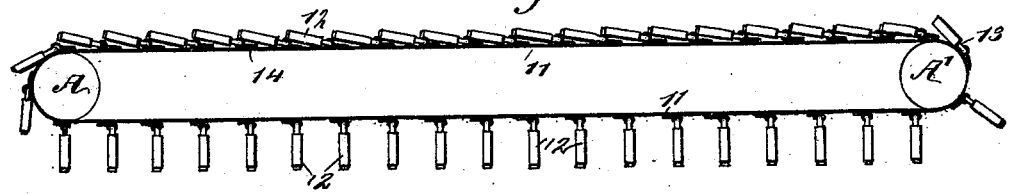
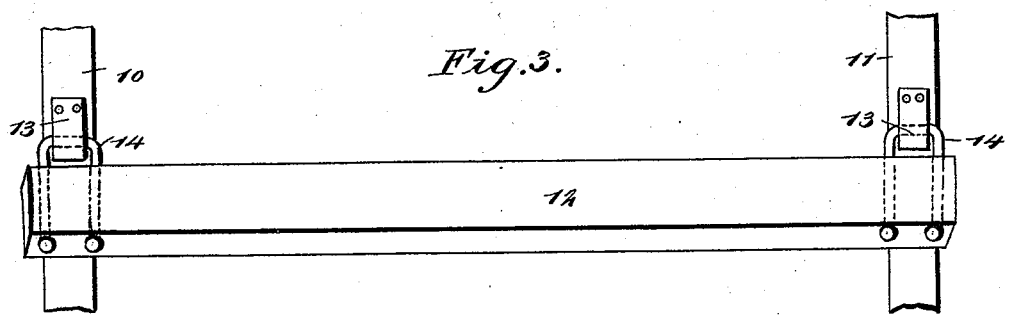
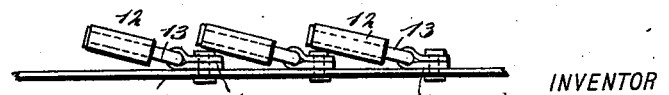
WITNESSES:
INVENTOR
BY
ATTORNEYS.

UNITED STATES PATENT OFFICE.

RICHARD KEELING, OF WALHALLA, NORTH DAKOTA.

RATTLE RAKE.

SPECIFICATION forming part of Letters Patent No. 517,865, dated April 10, 1894.

Application filed May 11, 1893. Serial No. 473,804. (No model.)

*To all whom it may concern:*

Be it known that I, RICHARD KEELING, of Walhalla, in the county of Pembina and State of North Dakota, have invented a new and Improved Rattle Rake, of which the following is a full, clear, and exact description.

My invention relates to an improvement in rattle rakes, and it has for its object to so construct the same that a much larger surface will be provided for the exit of grain upon the lower stretch of the rake than at the upper surface or top stretch, thus permitting the material falling upon the rake to quickly leave it, and likewise preventing the straw from winding around the rollers or drums carrying the rake, which difficulty is experienced to a greater or less degree with most of the rakes at present in use.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the rake. Fig. 2 is an edge view thereof. Fig. 3 is a perspective view of one of the slats of the rake, illustrating the manner in which it is attached to the carrying belts; and Fig. 4 is an enlarged edge view of a portion of the belt, illustrating the manner in which the slats lie on the top stretch of the belt and their relation to each other.

In carrying out the invention the rake is composed of two endless carrying belts 10 and 11, which constitute the side edges of the rake, and a series of slats 12, which are connected at their ends with the belts 10 and 11. The belts 10 and 11, may be made of canvas, leather, or like material, and the slats 12, are preferably made of wood. They may be given any desired cross sectional shape, and the length of the slats determines the width of the belt. The slats have hinged connection with the belts 10 and 11, and this connection is preferably made by riveting or otherwise securing loops or eyes 13 upon the belts, the loops or eyes upon each belt being arranged equi-distant apart. Therefore the loops or eyes may be said to be in horizontally arranged pairs, one loop or eye of a pair being located upon each belt, as shown in Fig. 3. Usually loops are employed and they may be made of leather or metal; ordinarily however, leather or stout fabric is employed for the purpose. Staples 14, usually made of wire, are passed through the slats, one staple at each end, the body of the staples having first been passed through the loops or eyes 13 with which they are to be connected. After the members of the staples have been passed through suitable apertures in the slats, the staples are permanently held in the slats by riveting the projecting ends of the members of the staples and providing them with burrs or the equivalents of them. The slats are so arranged with respect to each other that upon the upper stretch of the belt, where the slats naturally assume practically a horizontal position, the slats will rest upon the loops of the slats in advance, but in no manner will one slat overlap the other, as when the slats are in their folded or horizontal position a predetermined space will always remain between them through which the straw or other material delivered to the belt may pass.

By the construction of loop and staple shown the slats are hinged with a freedom of motion in both directions and without elevating the hinged edge of the slats above the belt as in cases where strap hinges are employed. It will also be seen that the slats and loops are so arranged that on the upper run of the carrier the free edges of the slats rest upon the loops avoiding the wear incident to a bearing of slat against slat. The arrangement of slats is also such that they are spaced apart on the upper run of the rake and are fully apart on the lower run securing a limited screening upon such upper run and a free discharge at the lower run.

The belt is as usual passed over two drums A and A', and it is evident that the slats on the lower stretch of the belt will assume a perpendicular position, and in assuming such a position the space between them will be far greater than the space between the folded slats on the upper stretch. Therefore the straw that falls through the upper slats will be provided with a much larger exit space than that provided for it on the upper stretch;

therefore the straw will quickly free itself from the belt, and the straw will also be prevented from winding around the drums and clogging the movement of the belt, which is a difficulty common to most rattle rakes now in use.

Having thus described my invention, I claim as new and desire to secure by Letters Patent—

1. A rake substantially as described comprising the endless guides, the loops secured to said guides and the slats pivoted at one edge to said loops and arranged at their opposite or free edges each to rest upon the loop supporting the adjacent slat all substantially as and for the purposes set forth.

2. The improved rattle rake herein described, consisting of the endless guide belts, the loops or eyes secured thereon, the slats having at one edge staples engaging said guide belts, the loops, staples, and slats being constructed and spaced, substantially as described, whereby upon the upper run of the rake the slats will be spaced apart at their adjacent edges, such space being narrower than the space between the hanging slats upon the lower run of the rake, and the free edges of the slats on the upper run of the rake being rested upon the loops, which secure the adjacent slat, substantially as shown and described.

RICHARD KEELING.

Witnesses:
JOHN THOMAS BRIDEN,
CHARLES WESLEY ANDREWS.